United States Patent [19]
Mayeda et al.

[11] Patent Number: 4,753,297
[45] Date of Patent: Jun. 28, 1988

[54] ROTARY DISK TOOL ASSEMBLY AND MATERIAL DISPENSING AND CROP CUTTING IMPLEMENTS

[75] Inventors: Bruce H. Mayeda, Longmont; Robert R. Owen, Evergreen, both of Colo.

[73] Assignee: The Eversman Mfg. Company, Denver, Colo.

[21] Appl. No.: 854,989

[22] Filed: Apr. 22, 1986

Related U.S. Application Data

[63] Continuation-in-part of Ser. No. 643,879, Aug. 24, 1984.

[51] Int. Cl.⁴ .................. A01B 39/08; A01B 39/14
[52] U.S. Cl. ........................................ 172/4; 111/7;
    172/526; 172/169; 172/484; 56/192; 56/157
[58] Field of Search ............ 172/522, 526, 169, 624.5,
    172/310, 739, 740, 4; 111/7; 56/503, 192, 13.6,
    157

[56] References Cited

U.S. PATENT DOCUMENTS

| | | | |
|---|---|---|---|
| 1,365,037 | 1/1921 | Johnson | 172/522 |
| 2,064,480 | 12/1936 | Lock et al. | |
| 2,187,833 | 1/1940 | Lock et al. | 172/522 |
| 2,546,260 | 3/1951 | Fornex | 172/169 |
| 3,129,773 | 4/1964 | Freeman | 172/522 |
| 3,830,047 | 8/1974 | Asumendi | 172/526 |
| 4,294,181 | 10/1981 | Smith | 172/169 |
| 4,384,444 | 5/1983 | Rossler | 172/526 |
| 4,489,787 | 12/1984 | Gary | 172/526 |
| 4,506,610 | 3/1985 | Neal | |
| 4,585,073 | 4/1986 | Mayeda | 172/158 |

FOREIGN PATENT DOCUMENTS 363446 3/1973 U.S.S.R. .............................. 172/526

OTHER PUBLICATIONS

Hiniker, Econ-o-Till 3000/3500 Advertising Brochure of Hiniker Co. Mankato, MN.
The Farm Show, vol. 8, No. 6, 1984, p. 27.

*Primary Examiner*—Richard J. Johnson
*Attorney, Agent, or Firm*—Fields, Lewis, Pittenger & Rost

[57] ABSTRACT

An agricultural tool assembly includes a rotary disk mounted on a lower end of a rotary spindle. A mount for the spindle includes a shank adapted to be received in the vertical slot of a clamp and a sleeve for rotatably supporting the spindle. The sleeve is connected to the shank by spaced side plates connected to the sleeve with a lower pivot member and an upper fastener extending through arcuate slots in the spaced plates. A cultivator implement has front and rear disk gangs and a rear centered tool assembly. An onion undercutting implement has a front tool bar with front tool assemblies clamped thereto and a rear tool bar with rear tool assemblies clamped thereto.

A tool assembly for material distribution has a spindle with a through hole, a swivel fitting at the inlet and a flared section at the outlet. Crop cutting and windrowing apparatus has pairs of tool assemblies tilted in and down toward the crop row and forwardly and down. Apparatus is provided to maintain the disks at a substantially constant depth.

19 Claims, 7 Drawing Sheets

Fig_13

Fig_14

Fig_19

Fig_20

Fig_21

Fig_22

Fig_23

ROTARY DISK TOOL ASSEMBLY AND MATERIAL DISPENSING AND CROP CUTTING IMPLEMENTS

This application is a continuation-in-part of U.S. patent application Ser. No. 643,879, filed Aug. 24, 1984.

TECHNICAL FIELD

This invention relates to a novel and improved tool assembly and implements having a substantially horizontal rotary disk.

BACKGROUND ART

A variety of different types of agricultural tools referred to in the trade as shovels, blades, tines, and sweeps have heretofore been provided for performing agricultural operations which include crop cultivating, minimum tillage, crop cutting, and weed cutting.

A number of the present crop cultivators use a disk and knive, or a spring tine commonly called a "Danish Tooth," or a spider-like tool. These crop cultivators are frequently mounted on a shank in the slot of a tool bar clamp. Some attempts have been made to use horizontally disposed rotary disks for crop cultivating purposes. In general, those tools using a horizontally disposed rotary disk provided in the past have been an integral part of the implement or an integral part of a complete assembly and not an assembly that can be readily attached to an implement in place of other tools or used in combination with a conventional tool bar clamp or the like. In some instances the rotary disks heretofore provided have been power driven rather than freely rotatable.

The following are illustrative of the prior art patents using rotary disks for cultivating purposes:

Freeman U.S. Pat. No. 3,129,773 discloses a plurality of laterally spaced rotary disk blades mounted on a rigidly clamped axle of the vehicle in line with the axis of rotation of the disk blade.

Smith U.S. Pat. No. 4,294,181 discloses a ratary disk blade on the end of a vertical shaft that is made as an integral part of the implement frame.

Robinson U.S. Pat. No. 2,018,575 discloses the use of a rotary cutting disk mounted as an integral part of a frame for cutting the tops from onions.

The prior art also includes U.S. Pat. Nos. 4,294,181 and 4,506,610 disclosing subsoil disk cultivators having a hollow shaft to dispense material into the soil.

Prior art apparatus for cutting crops and windrowing is disclosed in U.S. Pat. Nos. 2,064,480 and 2,187,833.

In none of the above is the disk adjustable relative to the supporting frame for setting the tool at different elevations using a slidable shank in a clamp slot nor is the disk tilted to the side or adjustably tiltable forwardly and downwardly in relation to the horizontal plane using the same means. No adjustment of the tool elevation to follow crop row elevation is disclosed.

DISCLOSURE OF INVENTION

A rotary disk tool assembly includes a disk secured to one end of a rotary spindle. The spindle is supported for free rotation in a sleeve that in turn is connected to a shank. The sleeve is connected to an intermediate connecting member which in turn is pivotally connected to the lower end of a shank and fastened above the pivotal connection to dispose the disk horizontally or at a slight incline to the horizontal plane. The upper fastener is a shear pin or a solid bolt fastener disposed in slots in the connecting member. The shank is movable in a slot of a clamp and clamped relative to a tool bar or like support on the implement to adjust the depth of the disk, and movement of the clamp laterally of the tool bar adjusts the lateral position of the disk relative to the crop row. The shank is readily removable from the clamp so that the assembly can be mounted to and dismounted from a variety of different types of presently available implements having a tool bar or the like. A cultivator implement disclosed has upright front and rear disk gangs and a centrally disposed tool assembly. An onion cutting implement disclosed has a plurality of front and rear tool assemblies at laterally spaced intervals to undercut rows of onions and the like.

A tool assembly for material distribution has a spindle with a through hole, a swivel fitting at the inlet end and a flared section at the outlet end to distribute material into the soil as the disk penetrates the soil. A crop cutting and windrowing implement for beans includes pairs of tool assemblies with each pair of disks positioned forwardly and downwardly at a selected tilt angle and tilted laterally in and down toward the crop row as the disk penetrates the soil to form a windrow together with vine dividers preceding each pair of disks.

BRIEF DESCRIPTION OF DRAWINGS

The details of this invention will be described in connection with the accompanying drawings, in which.

DETAILED DESCRIPTION

Figures 1, 2, 3, 4, 5, 6:
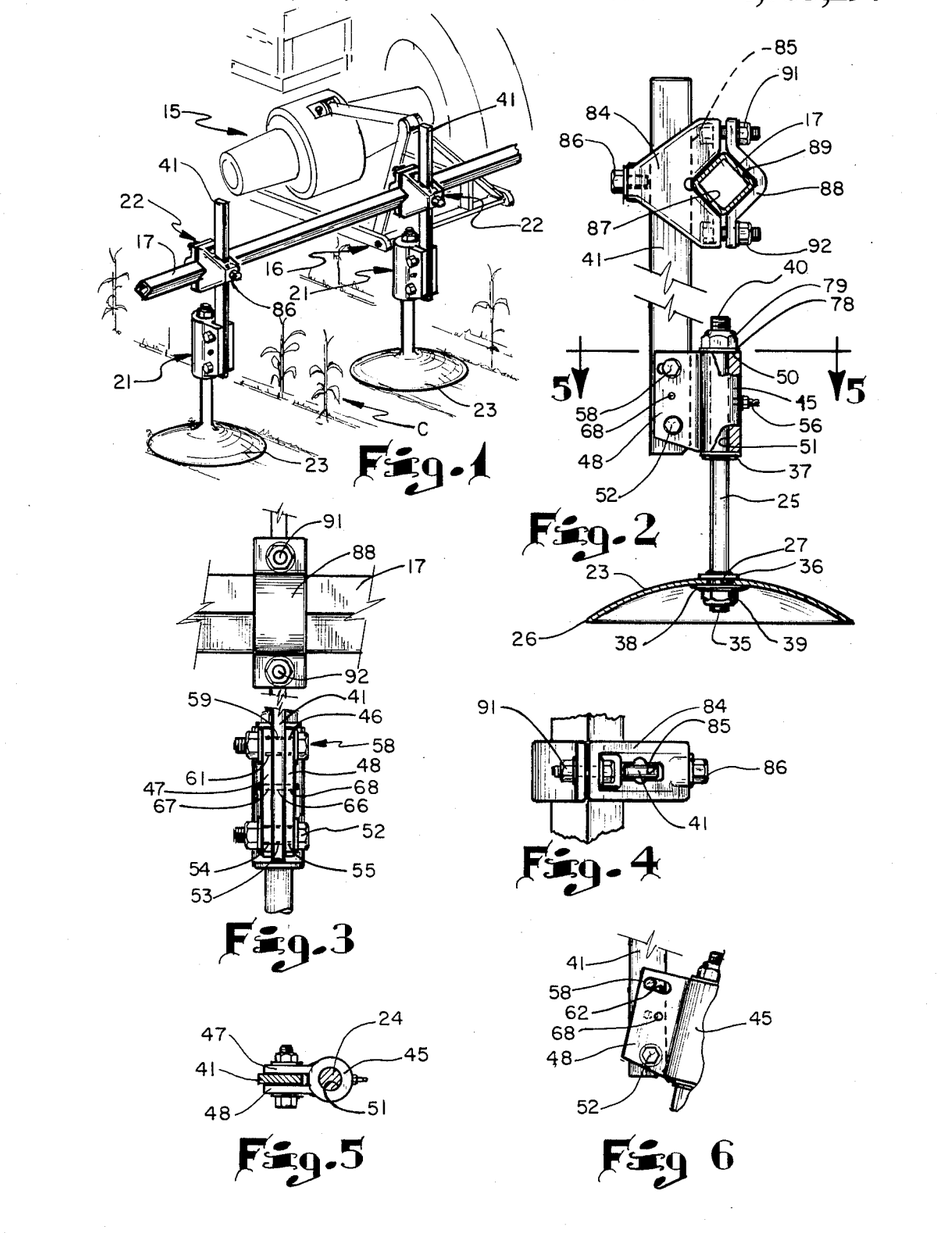
FIG. 1 is a rear perspective view showing rotary disk tool assemblies of the present invention on a solid bar support.
FIG. 2 is a side elevation view of the tool assembly shown in FIG. 1 with portions broken away to show interior parts.
FIG. 3 is a rear elevation view of the tool assembly shown in FIG. 2 with portions shown in section.
FIG. 4 is a top plan view of the assembly shown in FIG. 2.
FIG. 5 is a sectional view taken along lines 5—5 of FIG. 2.
FIG. 6 is a fragmentary side elevation view showing the adjustable tilt mount for the spindle with the head of the upper fastener removed.

Referring now to the drawings, there is shown a rear portion of a tractor 15 on which there is mounted a conventional three-point hitch 16 carrying a tool bar 17 to illustrate a solid bar mounting that is presently in use for carrying various types of cultivator tools such as shovels, blades, tines, sweeps and the like. Rotary disk tool assemblies 21 embodying features of the present invention are shown mounted at laterally spaced positions on a tool bar 17 using a tool bar clamp 22 for each assembly 21. As shown in FIG. 1, the assemblies 21 are disposed on opposite sides of a crop row C and have their disks 23 at least partially submerged in the soil for cultivating the soil on each side of the crop row C. Although only two assemblies 21 are shown on the tool bar in FIG. 1, it is understood that the bar can carry several to cultivate more than one crop row.

Each tool assembly 21 shown, generally stated, includes a rotary disk 23 mounted to an end of a rotary shaft or spindle 25. Each disk 23 is a circular inverted dish of concavo-convex shape with the concave surface facing down and has a sharp peripheral cutting edge 26 that is moved in proximity to or submerged in the soil in a substantially horizontal plane. The cutting edge 26 may be provided by making an outside bevel or an inside bevel on the periphery of the disk 23. The disk 23 shown is a segment of a sphere and it is understood that conical or flat (coulter) disks may also be used.

The disk 23 is made with a central opening 27 sized to slidably fit over the lower end portion of the spindle 25 to facilitate its ready removal from the spindle and its replacement on the spindle so that other sizes and shapes of disks may be used on the same spindle. The lower end portion 35 of the spindle 25 is of reduced diameter and is provided with external threads. Threaded lower end portion 35 extends through the central aperture 27 in the disk.

A lower washer 36 is affixed to the spindle as by welding above the lower threads to provide a lower stop for the disk. An upper washer 37 is affixed to the spindle above and in spaced relation to lower washer 36 to provide an upper stop to limit its extent of movement upwardly into the support sleeve 45 and close the lower end of the sleeve 45. A Belleville washer 38 having its concave surface facing up fits over the threaded lower end portion 35 and a nut 39 threads on the lower end portion 35 to allow the disk blade 23 to be assembled on the spindle 25 and rigidly affix the disk to the spindle, as well as to allow the disk to be removed and replaced as required. The spindle further has an externally threaded upper end portion 40 extending above the top of sleeve 45.

An offset mount for the spindle 25 includes an elongated shank 41 and a tubular housing or sleeve 45 that is offset from and adjustably connected to the shank 41. The sleeve 45 has a top surface 50 and an interior circular surface 51 complementary in shape to the exterior circular shape of the spindle. There is a close tolerance between the two concentric surfaces, yet the spindle and disk rotate freely relative to the sleeve. A grease fitting 56 is shown in the sleeve 45 to allow lubrication of the spindle 25. The spindle preferably is chrome-plated.

The connection between the sleeve and shank shown includes spaced left and right side plates 47 and 48 connected along one edge to the sleeve 45 to form an open slot sized to slidably receive and embrace the shank so that the shank 41 is slidable up and down between the spaced plates. A pivot member 52 in the form of a bolt, nut, and washers has the belt extending through an upper aperture 53 in the lower end portion of the shank and alined lower apertures 54 and 55 in the spaced side plates to pivotally mount the lower end portion of the shank to the spaced side plates.

An upper fastener 58 in the form of a bolt, nut, and washers has the bolt extending through an upper aperture 59 in the shank and through arcuate slots 61 and 62 in plates 47 and 48 to provide an angular movement of the axis of the spindle relative to the shank.

The shank 41 further has an aperture 66 between the pivot member 52 and the upper fastener 58. The spaced plates 47 and 48 have apertures 67 and 68, in alignment therewith when the spindle is vertical, adapted to receive a shear bolt for some applications, as is described hereinafter.

In the assembly of the spindle to the sleeve, the upper end portion of the spindle is inserted into the bottom of the sleeve, a top washer 78 is placed on the spindle, and a top nut 79 is threaded on upper threads 40 to hold the spindle for free rotation in the sleeve portion. The sleeve precedes the shank in the mounting shown in FIG. 1, leaving the slot formed by the spaced plates facing toward the rear.

The tool bar clamp 22 shown has a main body 84 with a vertical slot 85 of rectangular shape sized to slidably receive the shank of the tool assembly. This vertical slot provides interior guide surfaces for the shank 41 as it is moved up and down therein. A locking bolt 86 extends into the slot to bear against the shank and lock it at a selected elevation relative to the clamp.

The main body has a V-shaped recess 87 opposite the locking bolt shaped to accomodate one half of the tool bar 17 and a clamping bracket 88 having a V-shaped recess 89 shaped to receive the other half of the tool bar. The clamping bracket 88 is fastened to the main body by means of upper and lower bolt assemblies 91 and 92 which extend through respective apertures in the main body of the clamp.

This arrangement allows the clamp to be slid along the tool bar 17 and clamped in any position in relation to the crop row and, further, allows the shank 41 to be moved up and down relative to the tool bar to adjust the disk to a selected depth relative to the soil surface. Further the shank is readily demountable from the clamp so that the tool assemblies 21 may be readily removed from the tool bar and replaced as required.

By way of illustration but not limitation, the shanks may have dimensions of $\frac{5}{8}'' \times 2''$; $\frac{3}{4}'' \times 2\frac{1}{2}''$ or $1'' \times 3''$. The $\frac{5}{8}''$ and $\frac{3}{4}''$ shanks are heat-treated. The disks are 10'', 12'', 14'', 16'' 20'' or 22'' in diameter.

There are a variety of tool bar sizes and cross-sectional shapes presently in use on agricultural implements. These tool bar clamps will accomodate shanks of different sizes and cross-sectional shapes. A number of these presently available tool bar clamps allow adjustment of a shank up and down and laterally of the tool bar so as to allow for both lateral and vertical adjustment of the tool assembly.

In addition to the solid bar type mounting shown in FIG. 1, another example that is commonly in use is the parallel link such as the Yetter Row Crop Cultivator that has front and rear S-tines and a centered rear S-tine. The tool assembly of the present invention can be readily mounted in a clamp at the rear of the frame in place of the rear S-tine.

From the foregoing it is apparent that a desired number of the tool assemblies 21 may be mounted on the tool bar of a farm tractor having vertically slotted tool bar clamps or on the tool bar clamp on the frame of an agricultural implement as replacements for one or more conventional cultivating tools.

Figure 7:
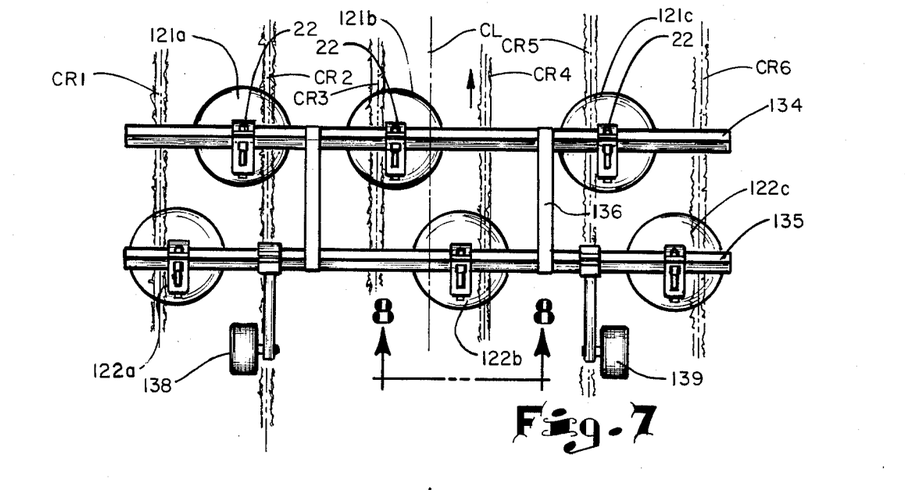
FIG. 7 is a top plan view of an implement for onion undercutting.
Figure 8:
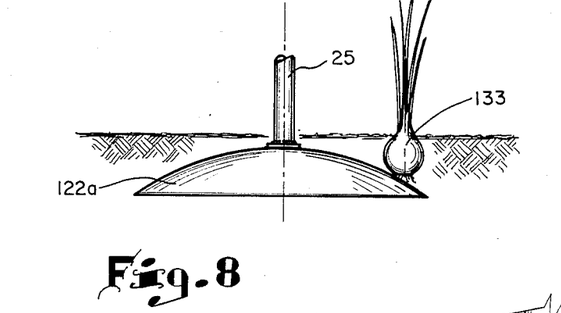
FIG. 8 is a sectional view taken along lines 8—8 of FIG. 7 showing the undercutting operation.
Figure 9:
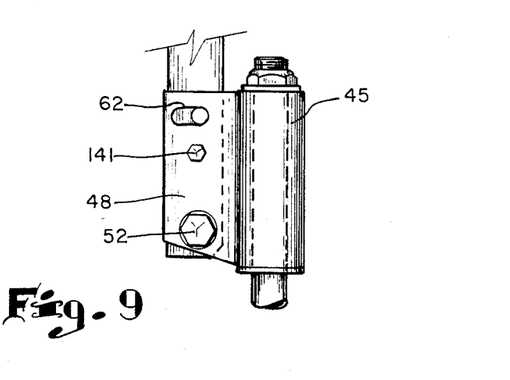
FIG. 9 is a side elevation view showing a portion of the tool assembly of the implement of FIG. using a shear pin.

The implement shown in FIGS. 7-9 is particularly suited for undercutting the roots of onions, garlic, etc., 133, as shown in FIG. 8. The implement shown has a supporting structure which includes a front tool bar 134 and a rear tool bar 135 that are connected together by a plurality of suitable laterally spaced longitudinal connecting members 136 on each side of the machine center line CL. A conventional hitch (not shown) is connected to the front tool bar. The direction of movement for the implement is shown by an arrow.

On the front tool bar 134 there is mounted, proceeding from left to right, a plurality of front tool assemblies 121a, 121b and 121c, each by means of a clamp 22, and the rear tool bar has a plurality of rear tool assemblies 122a, 122b and 122c mounted by means of clamps 22 to the rear tool bar.

The left rear tool assembly 122a undercuts the first crop row CR1, the left front tool assembly 121a undercuts the second crop row CR2, and the intermediate front tool assembly 121b undercuts the third crop row CR3, all to the left of the center line designated CL of the machine. To the rear of this machine, the intermediate rear tool assembly 122b undercuts the fourth crop row CR4, the right front tool assembly 121c undercuts the fifth crop row CR5, and the right rear tool assembly undercuts the sixth crop row CR6. The crop rows are equally spaced as, for example, 22 inches between rows. A pair of depth gage wheels 138 and 139 are mounted on the rear tool bar inside assemblies 122a and 122c, respectively, as shown.

In operation, as the implement moves along the line the disks extend to a preselected depth below the ground surface and cut the roots of the crop, such as the onions indicated. For this operation the disk is held in a horizontal plane and the assembly is fastened by means of a shear bolt 141 which extends through apertures 66, 67 and 68 above described. In the event the disk hits an obstruction, the shear bolt 141 will break and the spindle can pivot about pivot member 52 relative to the shank.

Figures 10, 11, 12:
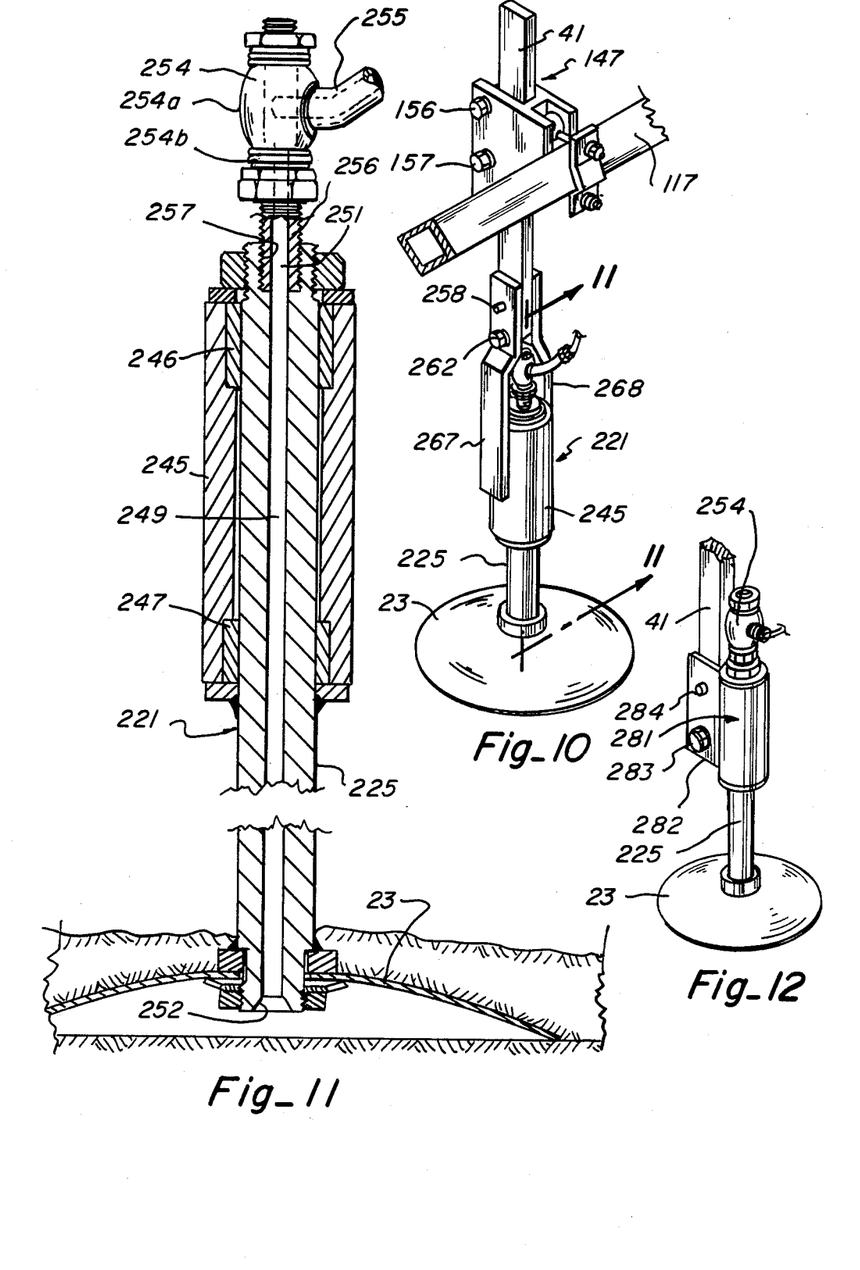
FIG. 10 is a perspective view of a tool assembly suitable for introducing selected materials into the soil.
FIG. 11 is a sectional view taken along lines 11—11 of FIG. 10.
FIG. 12 is a perspective view of another form of tool assembly suitable for introducing selected materials into the soil.

Referring now to FIGS. 10 and 11 there is shown apparatus for delivering materials such as herbicides, fertilizer and the like into the soil. These materials would typically be a liquid or a gas and would be pumped or free flowing. The liquids typically would be an herbicide or fertilizer and the gas a fertilizer. The apparatus shown includes a transverse tool bar 117 to which there is attached a clamping device 147. The clamping device 147 is of the type disclosed in copending application Ser. No. 832,333 entitled Bi-Directional Clamping Device and Clamping Apparatus. Briefly, this clamping device 147 has spaced plates that define a slot into which the shank 41 of the tool assembly will slide and be locked at a selected elevation by rotating a pair of bolts 156 and 157 with eccentric sections that move from a release position to a clamping position by rotating the bolts. As with the earlier described clamp 22 the clamp can be positioned anywhere along the tool bar and the shank can also be readily removed and replaced from clamp.

A modified form of tool assembly 221 is shown clamped by the clamping device 147 to the tool bar 117. This tool assembly includes a disk 23 secured to the end of a modified rotary spindle 225 in the same manner as above described with reference to FIGS. 1-6. The spindle 225 in turn is rotatably supported for free rotation in a modified sleeve 245.

Between the spindle and the sleeve there is provided an upper sleeve bearing 246 and a lower sleeve bearing 247 which supports the spindle to rotate freely relative to the sleeve. The spindle 225 is provided with a through hole 249 extending from a top inlet 251 to a bottom flared section 252 for passing the material therethrough. The flared section 252 helps to avoid having the outlet plug up with soil during use. A hollow swivel coupling 254 is connected to the upper end of the spindle. This coupling has an inlet pipe 255 into which the material is delivered from a suitable source (not shown) and an outlet pipe 256 with external threads that threads into internally threaded enlarged bore 257 in the top of the through hole of the spindle. The upper body part 254a of the coupling remains stationary and a lower part 254b rotates with the spindle.

The shank 41 is connected to the sleeve 245 by an intermediate connecting member in the form of a pair of spaced upright plates 267 and 268. The lower end portions of the spaced upright plates extend along opposite sides of the sleeve and are rigidly secured thereto as by welding. The upper end portions of the upright plates converge and extend along opposite sides of the lower end portion of the shank to embrace the shank and to locate the spindle in line with the shank.

A pivot member 262 extends through aligned apertures in the spaced plates and in the lower end portion of the shank to enable the sleeve to pivot relative to the shank about the pivot member 262.

A locking member in the form of a shear pin 258 extends through aligned apertures in the spaced plates and an aperture in the shank to lock the sleeve and disk 23 which is shown in a horizontal plane but preferably will be at a selected angle to provide for a forward and downward tilt for the disk. In the event the disk hits an obstruction the shear pin can break and the spindle will pivot about member 262. In use, material such as fertilizer is passed through the coupling 254, the through hole 249, flared section 252 and into the soil as the disk is submerged in the soil.

Typically, the disk will penetrate the soil about 5-6 inches when a gas is being distributed and about 3-4 inches when a liquid is being distributed. The soil penetrated by the disk will tend to come back over the area into which the material is deposited and form a seal so the gas does not escape. The diameter of the spindle is relatively small (typically 1 ½inches) as compared to the prior art and this makes a relatively small parting line thereby decreasing the chances of having the gas leak back through to the surface of the soil.

An alternative form of tool assembly 281 shown in FIG. 12 is constructed similar to assembly 221 above described with a top swivel coupling 254 but has a modified offset mounting including a pair of spaced side plates 282 connected at one end to a side of the sleeve and extending laterally out along opposite sides to embrace the lower end portion of the shank 41 to offset the spindle and disk 23 from the shank in a manner similar to the mounting arrangement shown in FIGS. 1-6. A lower pivot member 283 and upper shear pin 284 is shown connecting the shank to the plates 282.

Referring now to FIGS. 13 through 18 there is shown crop cutting and windrowing apparatus which includes a movable supporting frame having a transverse front tool bar 307 and a transverse rear tool bar 308 connected together by rigid longitudinal bar connectors 309 extending along each side. The rear tool bar has a pair of laterally spaced longitudinal connectors 312 on each side of the longitudinal center line CL of the apparatus which are releasably connected to the three point hitch of a tractor or the like to move the supporting frame over a field. A depth gage wheel assembly 315 is clamped to the rear tool bar by a clamping device 345 similar to device 147 above described on each side of the center line to set the depth of the tool assemblies to a selected depth relative to the soil surface. Each depth gage wheel assembly includes a shank, yoke, and wheel and the shank moves relative to the supporting frame by rotating eccentric sections on bolts 346 and 347 between released and locked positions.

Figures 13, 14:
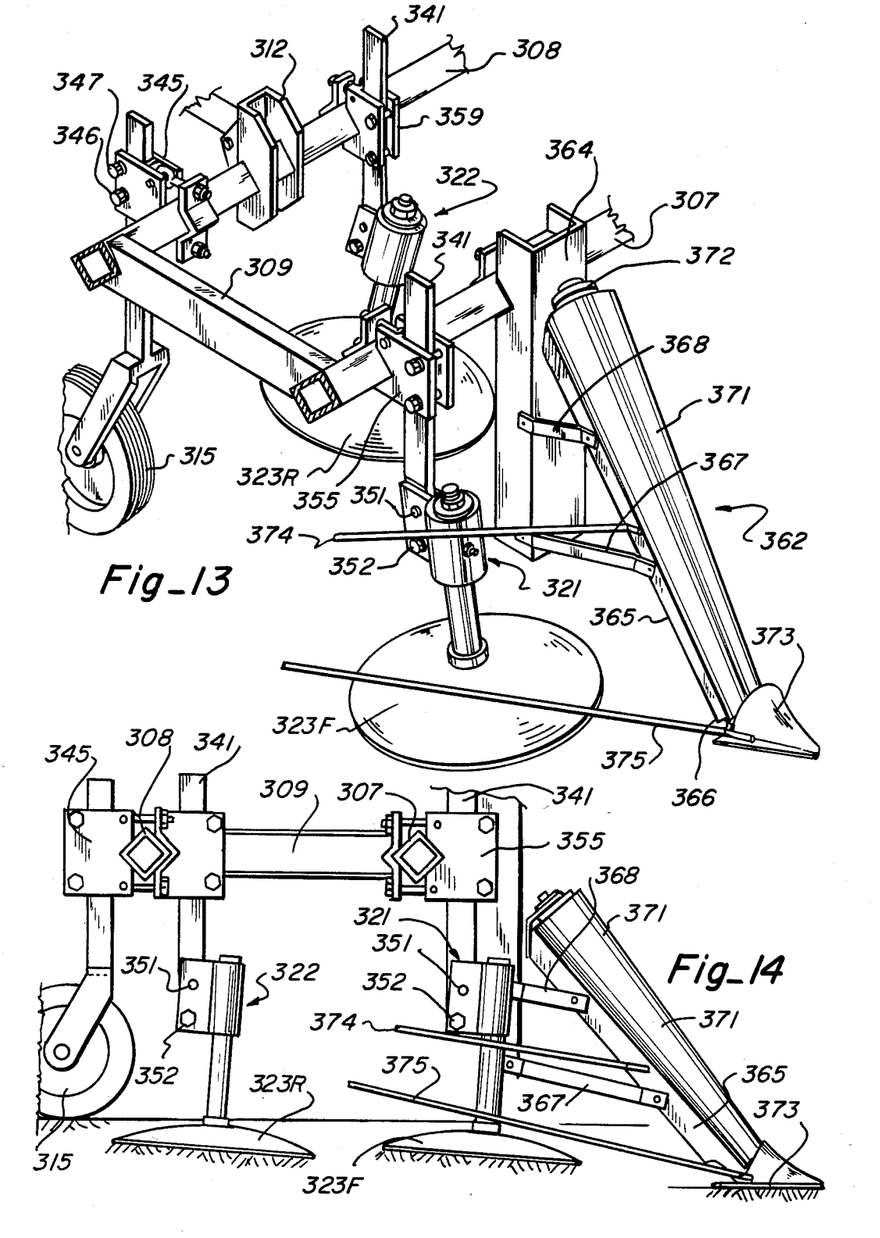
FIG. 13 is a front perspective view of a right side portion of a six-row crop cutting and windrowing apparatus embodying features of the present invention.
FIG. 14 is a side elevation view of the apparatus shown in FIG. 13.
Figure 15:
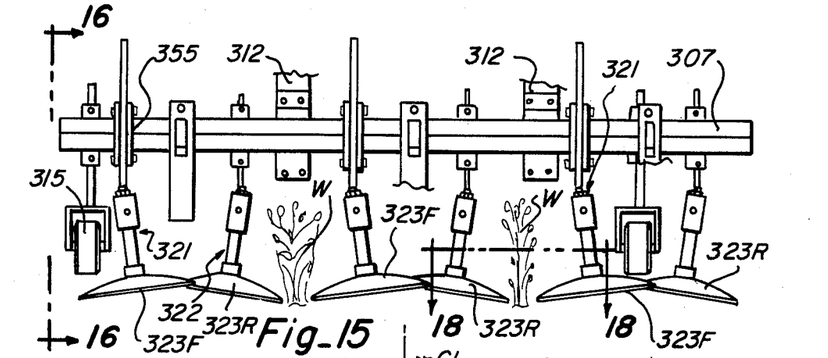
FIG. 15 is a front elevation view of the entire apparatus of FIG. 13.
Figure 16:
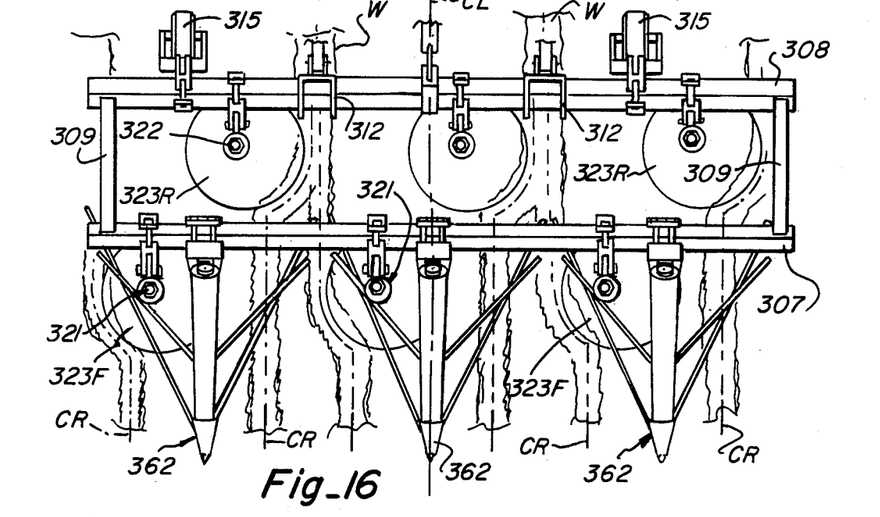
FIG. 16 is a top plan view of the apparatus shown in FIG. 15.

On the front tool bar proceeding from right to left in relation to the direction of travel there is mounted three laterally spaced front tool assemblies 321 each having a freely rotatable front disk 323F. Each front tool assembly is mounted by means of a clamping device 355 similar to device 147 above described. There is also shown mounted on the rear tool bar 308 three laterally spaced rear tool assemblies 322 each having a disk 323R. Each rear tool assembly 323R is mounted by means of a clamping device 359 similar to device 147 above described.

Figure 18:
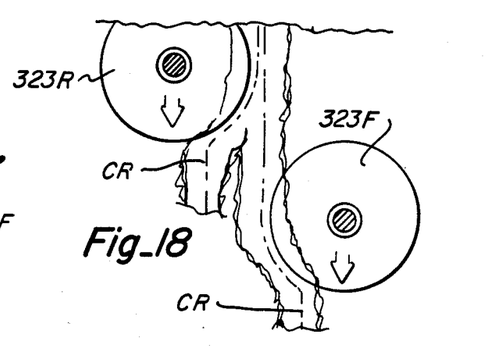
FIG. 18 is a top plan view of two laterally spaced front and rear disks of the apparatus of FIGS. 13–17 forming a windrow.

The disks then are arranged in pairs with the front disk 323F cutting a crop row CR and windrowing the cut crop to the right to form a part of a windrow W and the rear disk 323R cutting an adjacent crop row CR and windrowing the cut crop to the left. The disks of each pair are spaced from one another along or longitudinally of the frame so that when the pairs are repeated the disks are staggered so that two adjacent disks do not move the cut crop directly against the adjacent disk forming a common windrow W.

Each tool assembly 321 and 322 is of a construction similar to tool assembly 21 above described. Each front tool assembly 321 has a modified shank 341 with a straight upper section 342 and an inclined lower section 343 that disposes the associated disk in and down toward the crop row CR. Similarly, each rear tool assembly has a modified shank with a straight upper section and an inclined lower section that disposes the associated disk down and in toward the crop row.

Further, each front and rear disk is tilted down and forwardly at an angle. This tilt is provided by a shear pin 351 that extends through the aligned apertures in the spaced side plates and the lower end of the shank above the pivot member 352. Both the sidewise tilt and forward tilt are about 4 to 5 degrees.

Figure 17:
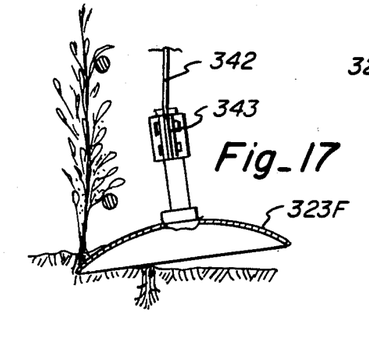
FIG. 17 is a fragmentary view showing bean vines being cut by the disk.

The crop row CR is located or lined up between the center of the disk and the side peripheral edge of the disk to provide a cut along the center line of the crop row and this provides the greatest range of cutting on either side of the row. This cutting with the dual tilt is more along a line to cut the roots than a wide cut the full width of the disk as is the case with onion cutting as above described.

A vine divider assembly 362 is mounted on the front tool bar 307 forwardly of each pair of front and rear tool assemblies to divide or separate the bean crop vines and direct them toward a line along which a trailing disk will cut.

Each vine divider assembly 362 includes a mounting bracket 364 fastened to the front tool bar, a support frame 365 with opposed upright end walls 366. Frame 365 is arranged to move up and down by parallel links 367 and 368 pivotally connected at the ends to the bracket and to the support frame 365. A tapered roller 371 has a shaft that is supported for free rotation in bearings 372 in the end walls 366. A ground engaging shoe 373 is mounted at the forward end of the support frame. An upper pair of divider rods 374 are connected at their front ends to the frame and diverge away from one another toward the rear. A lower pair of divider rods 375 are connected at the front ends of the frame and diverge away from one another toward the rear. Each vine divider assembly 362 functions to clear a pathway for trailing vehicle wheels not shown which are aligned with the shoe 373 and each pair of front and rear disks continue this pathway.

In use, the divider assembly 362 clears the vines and the front disk cuts and turns the cut crop to the right and the rear disk cuts and turns the cut crop to the left to form the windrow W.

Figure 19:
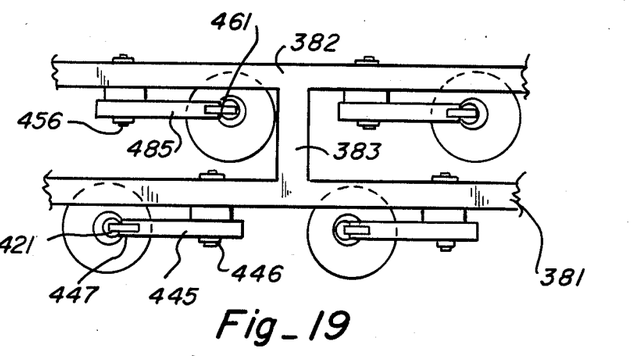
FIG. 19 is a top plan view of another form of crop cutting and windrowing apparatus.
Figure 20:
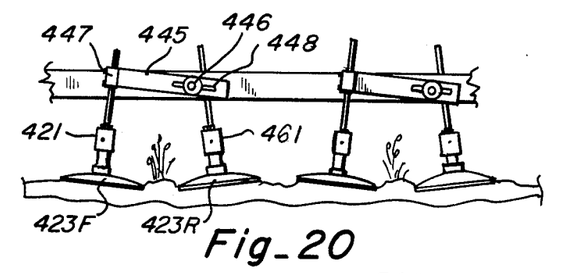
FIG. 20 is a front elevation view of the apparatus shown in FIG. 19.

Referring to FIGS. 19 and 20 there is shown another form of apparatus for cutting and windrowing which includes a movable supporting frame having a transverse front frame member 381 and a transverse rear frame member 382 connected by a longitudinal bar connector 383. This mounting arrangement is constructed to change the sidewise tilt angle for the disk using a straight shank. A front tool assembly 421 is supported on laterally extending front support arm 445 that is pivotally connected at one end to the frame by a pivot member 446 and has the tool assembly 421 mounted by a clamping device 447 to the opposite free end. The angle of tilt is adjusted by loosening the pivot member 446 which typically is a bolt and nut assembly and setting the angular position of the arm. The support arm 445 has a slot 448 in which the pivot member will slide to adjust the spacing between front and rear disks each time the tilt angle is changed. Similarly, a rear tool assembly 461 is supported on a rear support arm 485 similar in construction to arm 445 and is connected to the frame member 382 by a pivot member 456.

Figure 21:
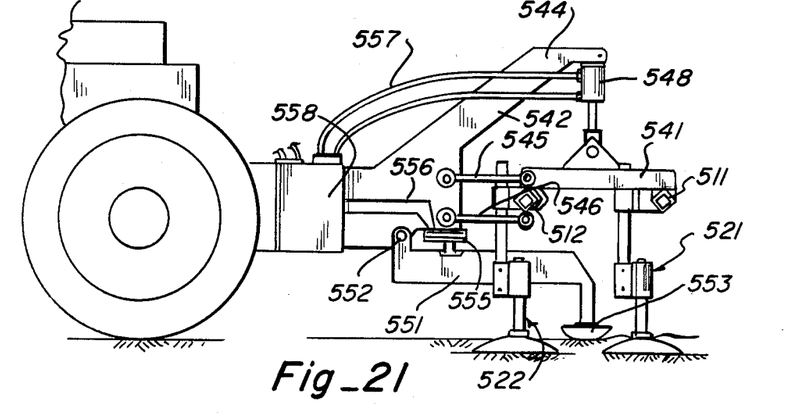
FIG. 21 is a side elevation view of another form of crop cutting and windrowing apparatus.

Referring now to FIG. 21 there is shown another form of apparatus for cutting and windrowing including spaced transverse front and rear tool bars 511 and 512 respectively support front and rear tool assemblies 521 and 522 respectively by means of associated clamping devices in the same manner as above described with respect to the apparatus shown in FIGS. 13-18. Typically at least two or more pairs of front and rear tool assemblies are provided on this apparatus. A longitudinal connecting bar 541 joins tool bars 511 and 512 to make up a rigid supporting frame. This supporting frame is connected to the front of a vehicle frame 542 by upper and lower parallel bar links 545 and 546 so that the tool bars and tool assemblies may be moved up and down relative to the vehicle frame 542. A two-way hydraulic cylinder 548 is mounted between an overhanging portion 544 of the vehicle frame and the connecting bar 541 to provide the motive power to move the tool assemblies up and down by actuating the cylinder 548.

A row level sensor shown includes a pivot arm 551 pivotally connected at one end to the frame by pivot 552. A ground engaging member 553 is mounted on the opposite forward end of arm 551 and engages the ground surface along the crop row. Member 553 is shown between the disks of the front and rear tool asemblies. The angular position of the arm 551 changes with a change in the elevation of the crop row. A mechanical to electrical position sensor 555 is mounted on the support frame adjacent to the pivot arm 551 and is shown as having a plunger that is moved in response to the movement of the pivot arm. The movement of the pivot arm produces an electrical signal that is connected by electric lines 556 to a control valve 558. The fluid flows from valve 558 to cylinder 548 through flow lines 557. An electric signal representing a change of mechanical movement changes the setting of the cylinder 548 to adjust the elevation of the ground-penetrating disks of the multiple pairs of tool assemblies 521 and 522 so they are maintained at substantially the same soil depth. If the soil elevation increases the cylinder 548 raises the disks and if the soil elevation decreases the cylinder lowers the disks. In this embodiment then a single elevation sensor regulates the elevation of at least two pairs of the disks and typically more than two pairs of the disks.

Figure 22:
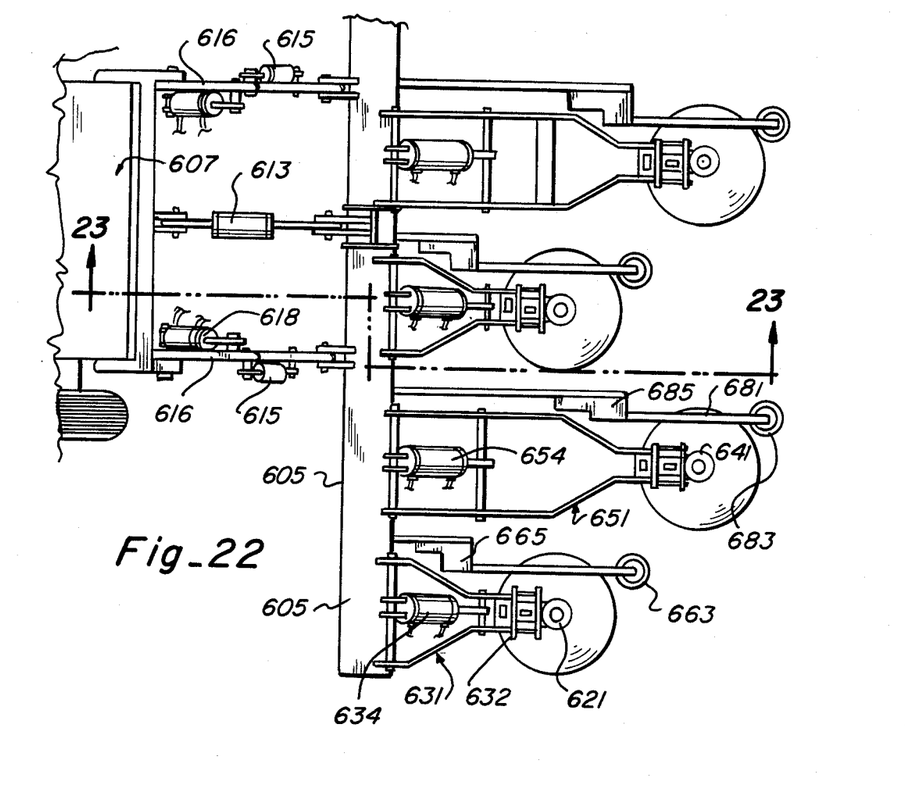
FIG. 22 is a top plan view of yet another form of crop cutting and windrowing apparatus.
Figure 23:
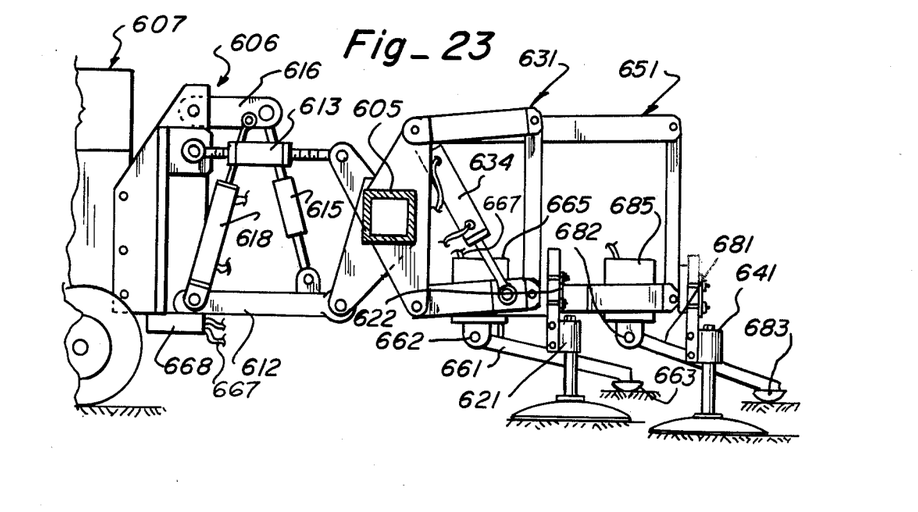
FIG. 23 is a sectional view taken along lines 23—23 of FIG. 22.

Referring now to FIGS. 22 and 23 there is shown apparatus wherein each tool assembly disk has an individual automatic elevation adjusting system. The apparatus shown includes a main transverse supporting frame 605 supported by a ram hitch assembly 606 on the front of a vehicle 607 such as a tractor. The ram hitch assembly 606 shown is of the type manufactured by Orthman Manufacturing, Inc.

Briefly, the ram hitch assembly 606 includes a pair of laterally spaced, lower link arms 612 pivotally connected at rear ends to the front of the vehicle and pivotally connected at their forward ends to the transverse supporting frame 605. A centrally disposed upper link arm 613 is pivotally connected at the rear end to the front of the vehicle and pivotally connected at the front end to frame 605. A pair of laterally spaced connecting links 615 each connect between the forward end of the lower link arm 612 and the forward end of an associated rocker arm 616. A two-way cylinder 618 connects from the rear end of the lower link arm to the rocker arm. When cylinders 618 are extended frame 605 is raised and conversely when cylinders 618 are retracted frame 605 is lowered.

A rear tool assembly 621 is connected by a clamping device 622 to a parallel linkage support assembly 631. Assembly 631 includes an upper arm and a lower arm, each pivotally connected at rear ends to the supporting frame and an outer arm pivotally connected to the forward ends of the upper and lower arms. A two-way cylinder 634 is connected between the rear end of the upper arm and the forward end of the lower arm. When the cylinder 634 is retracted the tool assembly 621 is raised and when the cylinder is extended the tool assembly 621 is lowered.

A rear row level sensor associated with the rear tool assembly 621 includes a pivot arm 661 pivotally connected at one end to the frame 605 at pivot 662 and has ground engaging member 663 is mounted at the opposite end. A mechanical to electrical position sensor 665 is mounted on the frame 605 and its plunger is moved by the movement of arm 661. The electrical signal produced by sensor 665 is connected by electric lines 667 to a control valve 668. Control valve 668 in turn controls the fluid flow to cylinder 634 over flow lines 669.

Similarly, a front tool assembly 641 is supported by parallel linkage support assembly 651. two way cylinder 654 moves the support assembly 651 to move the tool assembly 641. A row level sensor associated with the front tool assembly 641 includes a pivot arm 681 pivotally connected at one end to the frame 605 at pivot 682 and has a ground engaging member 683 at the opposite end. A position sensor 685 is mounted on frame 605 and its plunger is moved by the movement of pivot arm 681. As with the sensor for arm 661 above described when arm 681 moves a control valve controls the fluid flow to cylinder 654 to maintain the disk of the tool assembly at a substantially constant elevation.

Although the present invention has been described with a certain degree of particularity, it is understood that the present disclosure has been made by way of example and that changes in details of structure may be made without departing from the spirit thereof.

What is claimed is:

1. A tool assembly for agricultural purposes adapted for being connected to a movable supporting frame by a clamp with a slot and locking means comprising:
   a rotary disk having a peripheral cutting edge mounted to an end of a substantially vertical rotary spindle;
   an elongated shank, said shank having an upper section of substantially uniform cross sections for being slidably received in the slot of said clamp, set at a selected elevation by said locking means, and readily removed from and replaced on said clamp;
   a sleeve rotatably supporting said spindle;
   an intermediate connecting member between said shank and sleeve;
   a pivot member extending through a lower end portion of said shank and said connecting member to enable said sleeve to pivot in relation to said shank; and
   a locking member spaced from said pivot member along said shank and extending through said connecting member and shank to lock said connecting member and sleeve at a fixed position relative to said shank and to selectively position said disk and cutting, edge in a substantially horizontal plane or at an angle to a horizontal plane by pivoting about said pivot member, said risk being moved through the soil at a selected depth as said frame is moved along the ground.

2. A tool assembly as set forth in claim 1 wherein said spindle has a through hole extending from a top inlet to a bottom outlet for passing a material delivered to said top inlet through and out said bottom outlet for introduction of said material into the soil that has been penetrated by said disk, and
   a hollow swivel fitting coupled to the upper end of said spindle whereby said fitting remains stationary in relation to said spindle when said spindle is rotated.

3. A tool assembly as set forth in claim 2 wherein said through hole has a flared end section at the outlet end to avoid plugging by the soil.

4. A tool assembly as set forth in claim 1 wherein said intermediate connecting member includes a pair of spaced plates connected to said sleeve and extending along opposite sides of the end portion of said shank.

5. A tool assembly as set forth in claim 4 wherein said plates are upright and connected at lower end portions along opposite sides of said sleeve and extend upwardly from the top of said sleeve and along opposite sides of the lower end portion of said shank to locate said spindle in alignment with said shank.

6. A tool assembly as set forth in claim 4 wherein said plates are along the side and connected at one end to a side of said sleeve and extending laterally out from a side of said sleeve along opposite sides of the lower end portion of said shank to offset said spindle to one side of said shank.

7. A tool assembly as set forth in claim 4 wherein said locking member is a shear pin.

8. A tool assembly as set forth in claim 4 wherein said locking member is a bolt and nut assembly and said plates have elongated slots through which said bolt extends to facilitate a range of pivotal movement about said pivot member.

9. A tool assembly as set forth in claim 1 wherein said shank has a straight upper section and an inclined lower section provided by a sidewise bend from the longitudinal axis of the upper section to position each disk at a tilt angle to the horizontal plane.

10. In subsoil material distributing apparatus for delivering herbicides, fertilizer, and the like materials into the soil, the combination comprising:
a movable supporting frame;
a clamping member carried by said supporting frame having a slot and locking means;
a tool assembly connected to and suspended from said clamp, said tool assembly including
a rotary disk having a peripheral cutting edge mounted to an end of a substantially vertical rotary spiddle,
an elongated shank, said shank having an upper section of substantially uniform cross section slidably received in said slot, set at a selected elevation by said locking means, and readily removed from and replaced on said clamp,
a sleeve rotatably supporting said spindle,
an intermediate connecting member between said shank and sleeve,
a pivot member extending through a lower end portion of said shank and said connecting member to enable said sleeve to pivot in relation to said shank, and
a locking member spaced from said pivot member along said shank and extending through said connecting member and shank to lock said connecting member and sleeve at a fixed position relative to said shank and to selectively position said disk and cutting edge in a substantially horizontal plane or at an angle to a horizontal plane by pivoting about said pivot member, said disk being moved through the soil at a selected depth as said frame is moved along the ground.

11. In crop cutting and windrowing apparatus for beans and the like, the combination comprising:
a movable supporting frame having at least one pair of clamps each with a slot and associated locking means;
at least one pair of laterally spaced tool assemblies supported by said supporting frame, each said tool asembly having
a rotary disk with a peripheral edge mounted to an end of a rotary spindle,
an elongated shank,
said shank having an upper section of substantially uniform cross sections slidably received in the slot of an associated supporting clamp, set at a selected elevation by said locking means and readily removed from and replaced on said clamp,
a sleeve rotatably supporting said spindle,
an intermediate connecting member between said shank and sleeve,
a pivot member extending through a lower end portion of said shank and through said connecting member to enable said sleeve to pivot in relation to said shank, to position said disk forwardly and downwardly at a selected tilt angle,
a locking member extending through said connecting member and shank to lock said sleeve at a fixed position relative to said shank,
each disk being tilted laterally in and down toward a crop row whereby the crop is cut between the center of the disk and an outer edge of the disk, said spaced pair of disks cutting crop roots and forming a windrow as said disks are moved in a soil penetrating position,
means on said supporting frame to control the depth of penetration of soil of said disks, and
a vine divider forwardly of said tool assemblies to separate the crop vines and direct them for cutting and windrowing by a trailing of said disks.

12. In apparatus as set forth in claim 11 wherein each shank has a straight upper section and an inclined lower section provided by a sidewise bend from the longitudinal axis of said upper section to position each disk at said laterally in and down tilt.

13. In apparatus as set forth in claim 11 wherein a lateral supporting frame connected to said frame by a pivot member disposes each shank at a selected tilt angle to the vertical to dispose each disk laterally in and down.

14. In apparatus as set forth in claim 11 wherein said pair of disks are spaced from one another along said supporting frame so that one disk cuts the crop and turns the cut crop to one side to form a windrow and the other disk cuts the crop of an adjacent row and turns the cut crop to the opposite side to form a windrow to enable flow through.

15. In apparatus as set forth in claim 11 wherein said means to control the depth includes at one vertically adjustable ground-engaging wheel mounted on said frame.

16. In apparatus as set forth in claim 11 wherein said means to control the depth includes a sensor to sense the surface elevation of the soil adjacent the disk and automatically changes the elevation of said disk as the surface elevation of the crop row changes to maintain the disk at a substantially constant depth.

17. In apparatus as set forth in claim 16 wherein each disk has an individual sensor.

18. In apparatus as set forth in claim 16 wherein at least two pairs of disks have a sensor.

19. In apparatus as set forth in claim 16 wherein said sensor includes a pivot arm having a ground engaging member arrangement to contact the soil adjacent the crop row, a mechanical to electrical position sensor actuated by said pivot arm, a control valve activated by soil sensor and a two-way cylinder connected to a tool assembly and responsive to an electrical signal from said sensor.

* * * * *